Aug. 19, 1969    J. J. BAJER    3,462,197
WHEEL RIM AND BALANCING WEIGHT FOR A MOTOR VEHICLE
Filed March 1, 1967
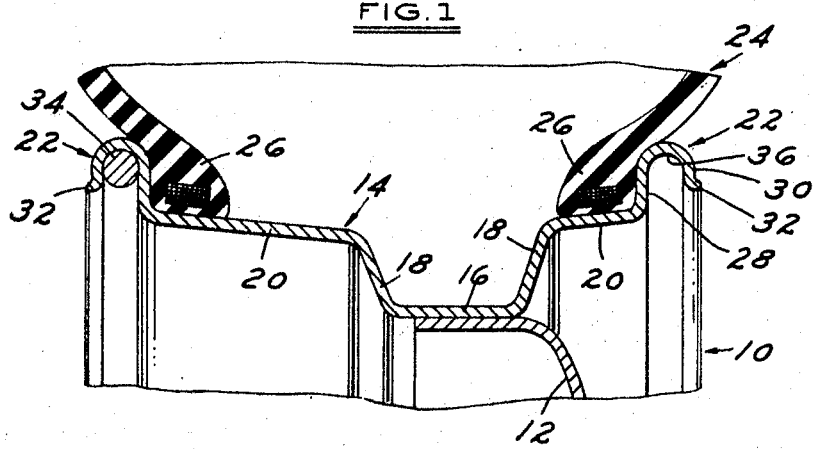
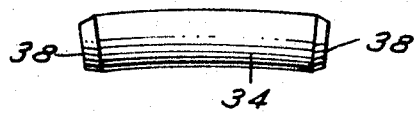
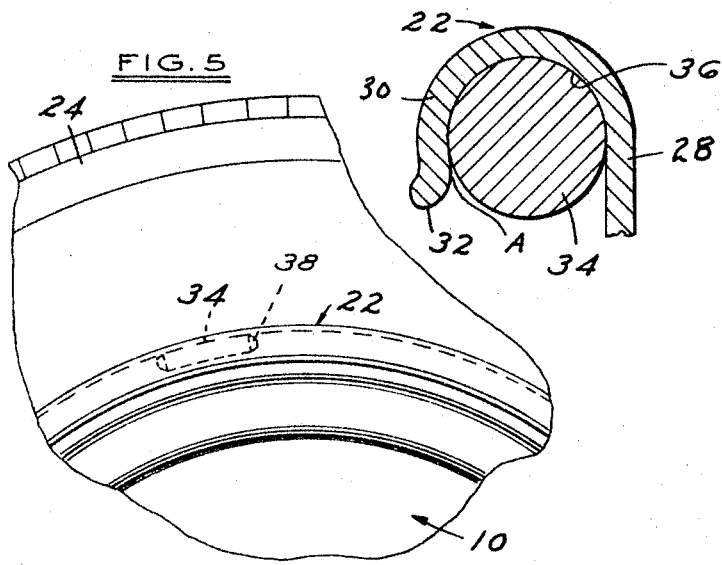
JACQUES J. BAJER
INVENTOR
BY John R. Faulkner
Clifford L. Sadler
ATTORNEYS – # United States Patent Office 3,462,197
Patented Aug. 19, 1969

---

3,462,197
WHEEL RIM AND BALANCING WEIGHT FOR A MOTOR VEHICLE
Jacques J. Bajer, Grosse Pointe Park, Mich., assignor to Ford Motor Company, Dearborn, Mich., a corporation of Delaware
Filed Mar. 1, 1967, Ser. No. 619,736
Int. Cl. B60b 1/00, 27/00
U.S. Cl. 301—5       2 Claims

---

ABSTRACT OF THE DISCLOSURE

A rim and balance weight combination for a motor vehicle wheel wherein the rim has a flanged edge portion that is adapted to resiliently retain a balancing weight formed from steel.

---

Background of the invention

It is conventional practice to balance motor vehicle wheels in order to prevent vibration at vehicle operating speeds. The vibration, in addition to being unpleasant, can cause excessive wear, particularly irregular wear of the vehicle tire. According to the prior art, balancing weights are formed from lead and have a spring clip that snaps onto the edge of the wheel rim. These clips have the disadvantage that they may gouge the tire and the lead is exposed in a position that is objectionable for styling reasons.

Brief summary of the invention

In accordance with the present invention, the wheel rim is provided with a flanged edge to form an annular pocket. A steel balancing weight having a generally circular cross section is inserted at an appropriate place in the annular pocket and is retained at that location by the resiliency of the wheel rim flange.

Brief description of the drawing

FIGURE 1 discloses a sectional view of a wheel and tire having a balancing weight retained in accordance with the present invention;
FIGURE 2 is a side elevational view of a balancing weight for use in the structure of FIGURE 1;
FIGURE 3 is an end view of the balancing weight of FIGURE 2;
FIGURE 4 is an enlarged view of the wheel rim flange and balancing weight of FIGURE 1; and
FIGURE 5 is a side elevational view of the structure of FIGURE 1.

Detailed description of the invention

Referring now to the drawings for a more detailed understanding of this invention, FIGURE 1 discloses a wheel and tire combination suitable for use on a motor vehicle. The wheel 10 has a spider portion 12 to which the rim portion 14 is welded. The rim may be of the conventional drop center type. The rim has a base portion 16 that is bordered by inside and outside flange portions 18. Adjacent to the flange portions 18 are inner and outer intermediate flanges 20. Finally, the rim is completed by the hook-shaped terminal flanges 22.

A tubeless tire 24 has its bead portions 26 seated on the intermediate flange portions 20 adjacent to the terminal flanges 22.

The terminal flange 22 is formed with a radially outwardly extending portion 28 and a radially inwardly extending portion 30. These portions are spaced apart to form an annular groove 36. The edge of the radially inwardly extending portion 30 terminates with an edge that is bent slightly axially outwardly as indicated at 32.

A balance weight 34 is positioned within the grove 36 of the terminal flange 22. In end view, as seen in FIGURE 3, the balancing weight 34 has a generally circular cross section. In side elevational view, FIGURE 2, the balancing weight has a slightly arcuate shape to match the annular contour of the groove 36. The ends of the weight 34 are tapered as indicated at 38.

Normally, the sides 30 and 28 of the groove 36 are spaced apart a distance less than the diameter of the weight 34. Thus, when the weight 34 is positioned in the groove 36, its placement must be done with force in order to bend the radial flange 28 outwardly. This elastic deformation permits seating of the weight 34 and the maintenance of a retaining force that holds the weight in position. The weight 34 is formed of steel so that it may withstand the force of the flange 30 without suffering deformation beyond its yield point.

As will be noted in FIGURE 4, in cross section the terminal flange 22 comprising the flange portions 28, 30 and 32 has a hook shape. The portions 30 and 32 combine to form an ogee curve. That is, the portion 30 is bent axially inwardly prior to the portion 32 that is bent axially outwardly. Thus, as seen in FIGURE 4, the point A which constitutes the axial limit of the flange portion 30 is spaced from the flange portion 28 a distance less than the diameter of the weight 34 and less than the distance between portions 28 and 30 outwardly thereof. With this arrangement, the cross sectional surface of the weight 34 is in contact with more than 180° of the internal surface of the groove 36 and, therefore, the weight 34 is securely retained in position. It should also be noted that centrifugal forces will tend to retain the weight in position rather than to separate it from the wheel.

In addition to the esthetic advantage of having the weight 34 tucked out of sight in the groove 36, the combination has distinct manufacturing advantages. The design is particularly adaptable to automated assembly.

The foregoing description constitutes the presently preferred embodiment of this invention. Modifications and alterations may occur to those skilled in the art that will come within the scope and spirit of this invention.

I claim:
1. A wheel for a motor vehicle having a steel sheet metal rim, said rim having spaced apart terminal flanges adapted to retain the beads of a pneumatic tire therebetween, one of said terminal flanges comprising spaced radially extending portions defining an annular groove that opens in a radially inwardly direction, said portion defining the outer wall of said groove having a generally ogee shape in cross section, an arcuate steel balancing weight fitted into said groove and having a generally circular cross section, said balancing weight having a diameter greater than the normal space between the radial portions of said groove whereby the resiliency of said outer radial portion retains said weight in position, and said groove having depth greather than the diameter of said weight whereby said weight is not visible when viewing said wheel from the side, said weight being provided with means to facilitate removal from said groove.

2. The combination of claim 1 wherein said balancing weight has conically tapered end portions.

References Cited

UNITED STATES PATENTS

| | | | |
|---|---|---|---|
| 3,048,445 | 8/1962 | Shoemaker | 301—37 |
| 2,137,415 | 11/1938 | Rubsam. | |
| 2,950,142 | 8/1960 | Lyon. | |
| 3,008,768 | 11/1961 | Kinsey. | |

FOREIGN PATENTS

| | | |
|---|---|---|
| 717,798 | 2/1942 | Germany. |
| 720,399 | 5/1942 | Germany. |

RICHARD J. JOHNSON, Primary Examiner

U.S. Cl. X.R.

301—63